United States Patent
White et al.

(10) Patent No.: US 9,778,920 B2
(45) Date of Patent: Oct. 3, 2017

(54) MOBILE DESIGN PATTERNS

(71) Applicant: Oracle International Corporation, Redwood Shores, CA (US)

(72) Inventors: Brent-Kaan William White, San Francisco, CA (US); Lynn Ann Rampoldi-Hnilo, Superior, CO (US)

(73) Assignee: Oracle International Corporation, Redwood Shores, CA (US)

( * ) Notice: Subject to any disclaimer, the term of this patent is extended or adjusted under 35 U.S.C. 154(b) by 535 days.

(21) Appl. No.: 14/527,654

(22) Filed: Oct. 29, 2014

(65) Prior Publication Data
US 2015/0058821 A1 Feb. 26, 2015

Related U.S. Application Data

(63) Continuation of application No. 12/957,166, filed on Nov. 30, 2010, now abandoned, and a continuation of
(Continued)

(51) Int. Cl.
*G06F 9/44* (2006.01)
*G06F 3/0481* (2013.01)
(Continued)

(52) U.S. Cl.
CPC .............. *G06F 8/38* (2013.01); *G06F 3/0481* (2013.01); *G06F 3/0488* (2013.01);
(Continued)

(58) Field of Classification Search
CPC .. G06F 3/0482; G06F 17/30867; G06F 3/048; G06F 8/38; G06F 17/3053;
(Continued)

(56) References Cited

U.S. PATENT DOCUMENTS 6,421,675 B1    7/2002   Ryan et al.
6,625,595 B1    9/2003   Anderson et al.
(Continued)

OTHER PUBLICATIONS

Nudelman, Greg; "The Mystery of Filtering by Sorting"; obtained at http:www.uxmatters.com/mt/archives/2009/07/the-mystery-of-filtering-by-sorting.php; Jul. 6, 2009, 15 pages.
(Continued)

*Primary Examiner* — Shen Shiau
(74) *Attorney, Agent, or Firm* — Trellis IP Law Group, PC

(57) ABSTRACT

A mobile design pattern. In an example embodiment, the design pattern includes a first user interface display screen that depicts a list of user interface controls organized in rows. Each row in the list includes a different set of one or more controls. Each different set of one or more controls is associated with a different set of functionality provided by one or more additional user interface display screens. The example design pattern further includes a second user interface display screen that is accessible via the different sets of one or more controls. The second user interface display screen includes a navigation bar, which includes one or more navigation controls and a title or header identifying a set of functionality associated with the different set of one or more controls. The second user interface display screen further includes an information-display region adapted to display data associated with the set of functionality.

20 Claims, 17 Drawing Sheets

Related U.S. Application Data application No. 12/792,571, filed on Jun. 2, 2010, now Pat. No. 8,924,371.

(51) Int. Cl.
*G06F 3/0488* (2013.01)
*G06F 3/0482* (2013.01)
*G06F 3/0484* (2013.01)

(52) U.S. Cl.
CPC ........ *G06F 3/0482* (2013.01); *G06F 3/04842* (2013.01); *G06F 8/20* (2013.01); *G06F 8/34* (2013.01)

(58) Field of Classification Search
CPC .......... G06F 2209/545; G06F 3/04897; G06F 3/0416; G06F 8/34; G06F 8/20; H04N 1/00413; H04N 1/00424; H04N 1/00427; H04N 21/485; G06N 99/005; G11B 27/34
See application file for complete search history.

(56) References Cited

U.S. PATENT DOCUMENTS

| | | | |
|---|---|---|---|
| 6,718,324 B2 | 4/2004 | Edlund et al. | |
| 7,139,762 B2 | 11/2006 | Labarge et al. | |
| 7,369,102 B2 | 5/2008 | Luke et al. | |
| 7,370,047 B2 | 5/2008 | Gorman | |
| 7,472,347 B2* | 12/2008 | Cooper | G06F 3/0481 715/235 |
| 7,623,888 B1* | 11/2009 | Wolter | H04M 1/72586 455/550.1 |
| 8,091,036 B1* | 1/2012 | Pavek | G06F 8/38 358/1.18 |
| 8,261,231 B1* | 9/2012 | Hirsch | G06F 8/20 709/201 |
| 8,489,984 B1* | 7/2013 | Violet | G06F 8/34 715/209 |
| 8,595,236 B2* | 11/2013 | Jain | G06F 17/30997 704/257 |
| 8,645,973 B2* | 2/2014 | Bosworth | G06F 12/0875 719/320 |
| 8,660,849 B2* | 2/2014 | Gruber | G06F 17/3087 340/988 |
| 8,843,853 B1* | 9/2014 | Smoak | G06F 3/0482 715/788 |
| 2003/0036927 A1 | 2/2003 | Bowen | |
| 2005/0071850 A1* | 3/2005 | Ittel | G06F 8/36 719/320 |
| 2006/0036745 A1* | 2/2006 | Stienhans | G06F 8/38 709/228 |
| 2006/0101442 A1* | 5/2006 | Baumgart | G06F 8/38 717/162 |
| 2007/0055943 A1* | 3/2007 | McCormack | G06F 3/0481 715/746 |
| 2007/0061335 A1 | 3/2007 | Ramer et al. | |
| 2008/0092057 A1* | 4/2008 | Monson | G06F 9/4443 715/744 |
| 2008/0227440 A1* | 9/2008 | Settepalli | H04M 1/274558 455/418 |
| 2010/0115434 A1* | 5/2010 | Yagi | G06F 8/38 715/763 |
| 2011/0185294 A1* | 7/2011 | Binder | G06F 8/38 715/762 |
| 2011/0302516 A1* | 12/2011 | White | G06F 3/0481 715/771 |
| 2012/0015624 A1* | 1/2012 | Scott | G06F 9/4443 455/405 |
| 2012/0124492 A1* | 5/2012 | Taron | G06F 9/4443 715/762 |
| 2013/0346940 A1* | 12/2013 | White | G06F 8/34 717/105 |

OTHER PUBLICATIONS

Add-on for Firefox; obtained at https:/addons.mozilla.org/en-US/firefox/browse/type:4; Oct. 9, 2009; 2 pages.
Aperture 2 100+ new features—obtained at http://www.apple.com/fr/aperture/features/100.html; Oct. 9, 2009; 5 pages.

* cited by examiner

*← 210

| 92 ↘ | Mobile Sales | 🔍 Search —ᴊ—94 | 🛒 Shop —ᴊ—96 |

| 212 ↘ | [Back] ⌐100 Opportunity: Create 214 ↘ [Save] |

218 ↘

| Name | Center for Disease Control |
| Customer | Center for Disease Control |
| Primary Contact | Jack Jones |
| Owner | C. Quota |

} 216

| Status | Open ▽ |
| Committed | ☐ |
| Win Probability | 70% ▽ |

| 220 ↘ | More | 224 ⌐ > |
| 222 ↘ | Notes(0) ⌐228 | 226 ⌐ + |

MOBILE DESIGN PATTERNS

CROSS REFERENCES TO RELATED APPLICATIONS

This application is a continuation of the following application, U.S. patent application Ser. No. 12/957,166, entitled MOBILE DESIGN PATTERNS, filed on Nov. 30, 2010, which is hereby incorporated by reference, as if it is set forth in full in this specification.

BACKGROUND

The present application relates to software development and more specifically to systems, methods, and patterns for facilitating designing software applications for use in mobile computing environments.

Software design methods for developing applications for mobile computing applications are faced with several challenges due in part to limited screen space for displaying user interfaces and limited computing resources, including memory, processor speeds, and network bandwidth limitations.

Limited screen space is a particularly limiting requirement for mobile software applications. Furthermore, mobile computing applications often run on mobile communications devices, such as cellular telephones, which often subject the user to multiple frequent distractions, including distractions from calls, text messages, changes in physical environment, and so on.

Mobile enterprise computing applications are particularly demanding, as mobile enterprise application users often must maintain connectivity with multiple computing resources and applications available via a corporate network.

Design methodologies and accompanying solutions that are generally applicable to desktop computing environments are often incompatible with mobile computing environments. As developers and project managers move their desktop applications to mobile devices, a comprehensive design approach is needed to create efficient and compelling user interfaces that account for mobile computing environment limitations and distractions.

In general, existing mobile application systems and methods facilitate designing software applications for specific mobile platforms, such as the iPhone®, Android™, Microsoft Windows Mobile®, BlackBerry®, and Symbian™ platforms. Unfortunately, existing mobile application development methodologies often fail to facilitate comprehensive design solutions suitable for a wide range of mobile platforms.

SUMMARY

An example design pattern for facilitating design of mobile computing applications includes a first user interface display screen that depicts a list of user interface controls organized in rows. Each row in the list includes a different set of one or more controls. Each different set of one or more controls is associated with a different set of functionality provided by one or more additional user interface display screens. The example design pattern further includes a second user interface display screen that is accessible via one or more of the different sets of one or more controls. The second user interface display screen includes a navigation bar. The navigation bar includes one or more navigation controls for navigating between user interface display screens and further includes a title or header identifying a set of functionality associated with the different set of one or more controls. The second user interface display screen further includes an information-display region that is adapted to display data associated with the set of functionality.

In a more specific example embodiment, the second user interface display screen further includes a second band of controls that is below or above the navigation bar, which stretches horizontally across a display of a mobile computing device, such as a cellular telephone. The second band of controls includes one or more icons that are associated with one or more functions of the set of functionality provided by the second user interface display screen.

The present example user interface pattern may include functionality to selectively change, add, or omit an icon from the second band of controls according to a status of a function associated with the icon. The one or more icons may include a search icon and a sort icon, which are adapted to change appearance in response to user selection thereof. The second band of controls includes a search field for searching data and displaying search results in the information-display region in response thereto. The second band of controls may include, for example, a favorites icon for selectively marking displayed data as a user favorite.

The second user interface display screen may further include a notification band that is adapted to provide status information pertaining to functionality accessible to a user. The status information may include an indication that information has been updated or that an object has been created, deleted, or updated.

In the present example embodiment, the first user interface display screen further includes a personalization control and a sign-out control for providing a personalization option and a sign-out option, respectively. The first user interface display screen includes a first row with a control for accessing a worklist. The first user interface display screen further includes a second row with a control for accessing functionality for managing information pertaining to opportunities and a third row with a control for accessing functionality for managing information in association with a calendar. In the specific example embodiment, the information in association with a calendar may include information pertaining to scheduled meetings, expenses, deal closings, sales information, and so on.

Certain embodiments disclosed herein may facilitate rapid design of mobile computing applications that work well on various mobile platforms, including iPhone®, BlackBerry®, Symbian™, Android™, and Windows Mobile® devices. Mobile design patterns (also called templates) disclosed herein adhere to various principles for facilitating usability and efficiency in mobile computing applications. Some of the design principles may include, but are not limited to: elimination of non-essential tasks, use of a flattened navigation model, usability in short spurts, efficient incorporation of business intelligence, access to simple searching and sorting, efficient access to collaboration mechanisms, minimization of screen real estate required to display relevant information and controls for accessing functionality, and suitability for browser or native implementation, such that applications may be browser-accessible or may run as native applications on a mobile device.

Certain embodiments disclosed herein may provide a comprehensive set of interworkable design patterns or templates and accompanying development software, which provide a framework for development of mobile computing applications. The framework facilitates conceptualization of solutions and designs, and is particularly useful for development of enterprise mobile applications and accompanying functionality. Various key areas of mobile software development are addressed, including page layout; example actions (e.g., search; navigation); personalization, and so on. Use of design patterns disclosed herein may facilitate increasing developer productivity and quality and may be particularly useful for developers using middleware to build mobile applications for enterprise applications, where the applications may run in a mobile browser or as native client-side applications.

A further understanding of the nature and the advantages of particular embodiments disclosed herein may be realized by reference of the remaining portions of the specification and the attached drawings.

BRIEF DESCRIPTION OF THE DRAWINGS

FIG. 2b is a diagram illustrating a second example display screen that is accessible via the first display screen of FIG. 2a.

FIG. 4a is a diagram illustrating a fourth example display screen that is accessible via the first display screen of FIG. 2a.

FIG. 4b is a diagram illustrating a fifth example display screen that is accessible via the fourth example display screen of FIG. 4a.

FIG. 5a is a diagram illustrating a sixth example display screen that is accessible via the second example display screen of FIG. 2b after create functionality is activated therefrom.

FIG. 6c is a diagram illustrating an eleventh example display screen for facilitating documenting and marking objects as favorites, which is accessible from the first example display screen of FIG. 2a.

DETAILED DESCRIPTION OF EMBODIMENTS

Although the description has been described with respect to particular embodiments thereof, these particular embodiments are merely illustrative, and not restrictive.

While certain embodiments are discussed herein with respect to implementations involving use of mobile computing devices, applications are not limited thereto. For example, any computing device with a limited display screen area, such as a tablet computing device, may benefit from organizations of functionality and user interface controls in accordance with one or more design patterns or templates disclosed herein.

For clarity, certain well-known components, such as hard drives, operating systems, routers, power supplies, and so on, have been omitted from the figures. However, those skilled in the art with access to the present teachings will know which components to implement and how to implement them to meet the needs of a given application.

Figure 1:
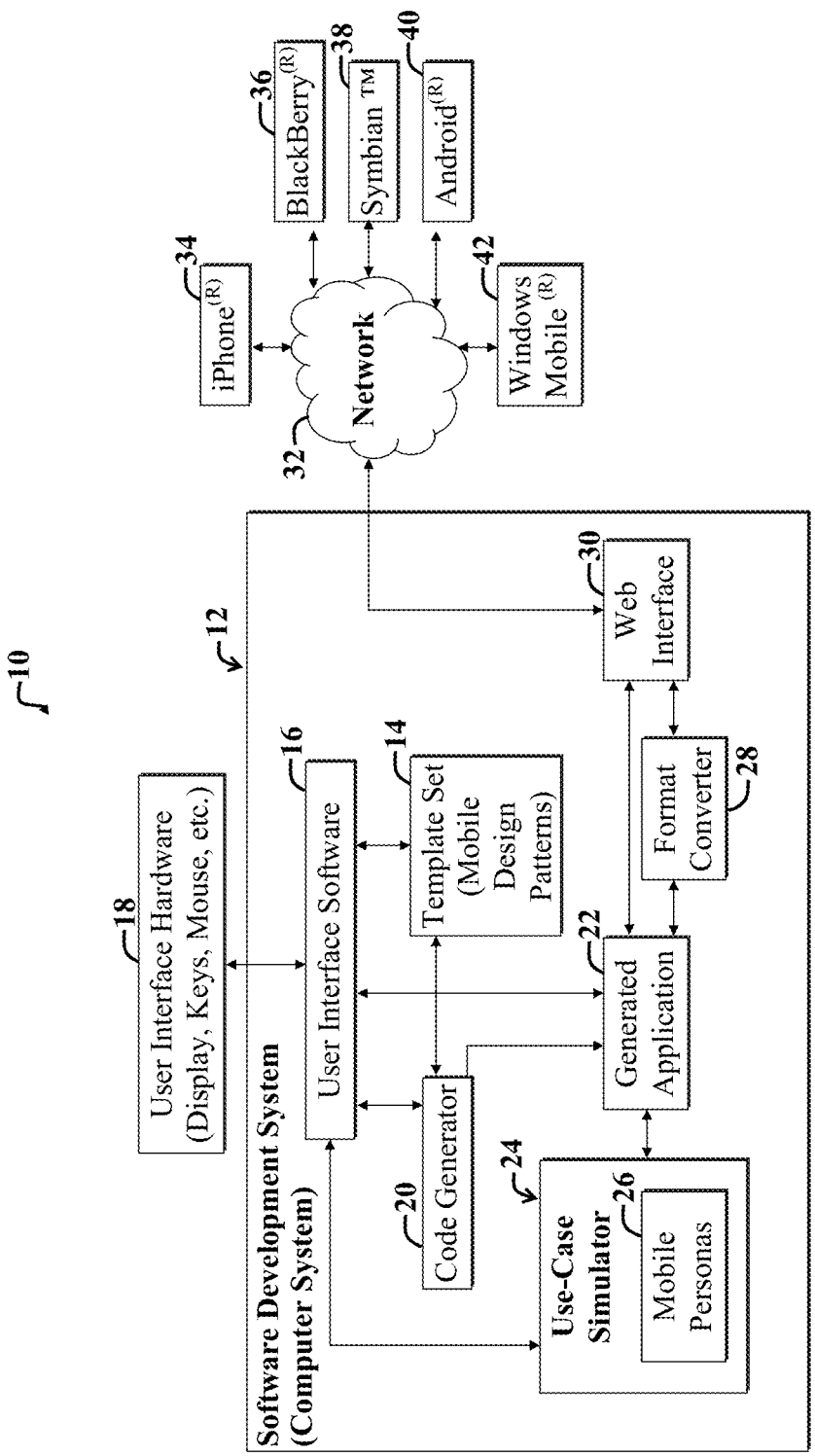
FIG. 1 is a diagram illustrating an example software development system for employing one or more mobile design patterns to construct applications for mobile computing devices.

FIG. 1 is a diagram illustrating an example software development environment 10 for employing one or more mobile design patterns 14 to construct applications 12 for mobile computing devices 34-42. The environment 10 includes a software development system 12 running user interface software 16. User interface display screens produced by the user interface software 16 are accessible to users via user interface hardware 18, which may include a display, keys, mouse, and so on.

The software development system 12, which may run on a computer system, such as a Personal Computer (PC), further includes a code generator 20 in communication with the user interface software 16. A set of mobile design patterns 14, also called templates, are accessible to the user interface software 16 and the code generator 20. The code generator 20 includes machine-readable instructions for selectively incorporating mobile design patterns from the template set 14 into a generated software application 22 in response to user input via the user interface software 16, as discussed more fully below. A generated software application 22 is accessible to the user interface software 16. A user may employ the user interface hardware 18 and the user interface software 16 to both provide input to the code generator specifying details of a software application to be generated with reference to the template set 14 and to test features of the generated application 22.

For illustrative purposes, an optional use-case simulator 24 is shown in communication with the generated application 22 and the user interface software 16. The use-case simulator 24 includes descriptions corresponding to different mobile personas 26. In the present example embodiment, the use case simulator 24 includes machine-readable instructions, i.e., computer code, for testing the generated application 22 in accordance with predetermined criteria corresponding to different mobile personas 26 and to provide feedback in response thereto to the user interface software 16. The feedback may be analyzed by a user to facilitate making adjustments to the generated application 22 via the code generator 20 and the user interface software 16. Exact details of the use-case simulator 24 are application specific. The feedback provided from the user-case simulator 24 to the user interface software 16 may include ratings organized in accordance with predetermined criteria associated with each of the mobile personas 26.

Those skilled in the art with access to the present teachings may readily determine and implement appropriate details to meet the needs of a given application without undue experimentation. For example, the use-case simulator 24 may generate an overall rating or score for the generated application 22, where the score indicates how the application meets predetermined criteria associated with each of the mobile personas 26. Example mobile personas include field sales representative, field service technician, retail merchandiser, manager, generation Y, and so on.

The software development system 12 further includes a web interface 30 for making the generated application 22 available to mobile computing devices 34-42 via a network 32, such as the Internet. The generated application 22 may be made available as a web service or other browser-accessible application. The application 22 may be accessible via one or more browsers running on the mobile computing devices 34-42. For the purposes of the present discussion, a web service may be any functionality, such as represented by a program, function, process, or other functionality, that is accessible or otherwise may be activated via a message sent over a network. An example message includes a Uniform Resource Locator (URL) sent over a network via HyperText Transfer Protocol (HTTP). Another example message includes an eXtensible Markup Language (XML) message sent in accordance with Simple Object Access Protocol (SOAP). Web services may be written in various languages, such as Web Services Description Language (WSDL), Java, and so on.

Alternatively, the generated application 22 may be made available for download to the mobile computing devices 34-42 (also called mobile devices) or for upload to another server. When a generated application is to be run client-side, i.e., as a native application running on one or more of the mobile devices 34-42, the code generator 20 may make certain adjustments to the application 22 so that the application can run as an executable or as a plug-in on the mobile devices 34-42.

For illustrative purposes, the mobile devices 34-42 are shown including an iPhone® 34, a BlackBerry® 36, a Symbian™ 38, an Android™ 40, and a Windows Mobile® 42 device. Note that applicable mobile computing devices 34-42 are not limited to those shown in FIG. 1. Other examples of applicable mobile computing devices include tablets, such as the iPad, and other mobile computers, such as an OQO. In general, use of the novel template set 14 facilitates generation of applications that are readily usable and that work efficiently on all of the different mobile devices 34-42, as discussed more fully below.

In certain implementations, it may be desirable to selectively format the generated application 22 for use by each of the different types of devices 34-42. In this case, a format converter 28 may be employed to selectively adjust the format of the generated application 22 in accordance with the type of device 34-42 that is requesting use of the application 22. The mobile devices 34-42 may access the generated application 22, such as for download or use as a browser-based application, via the web interface 30.

Figure 2A:
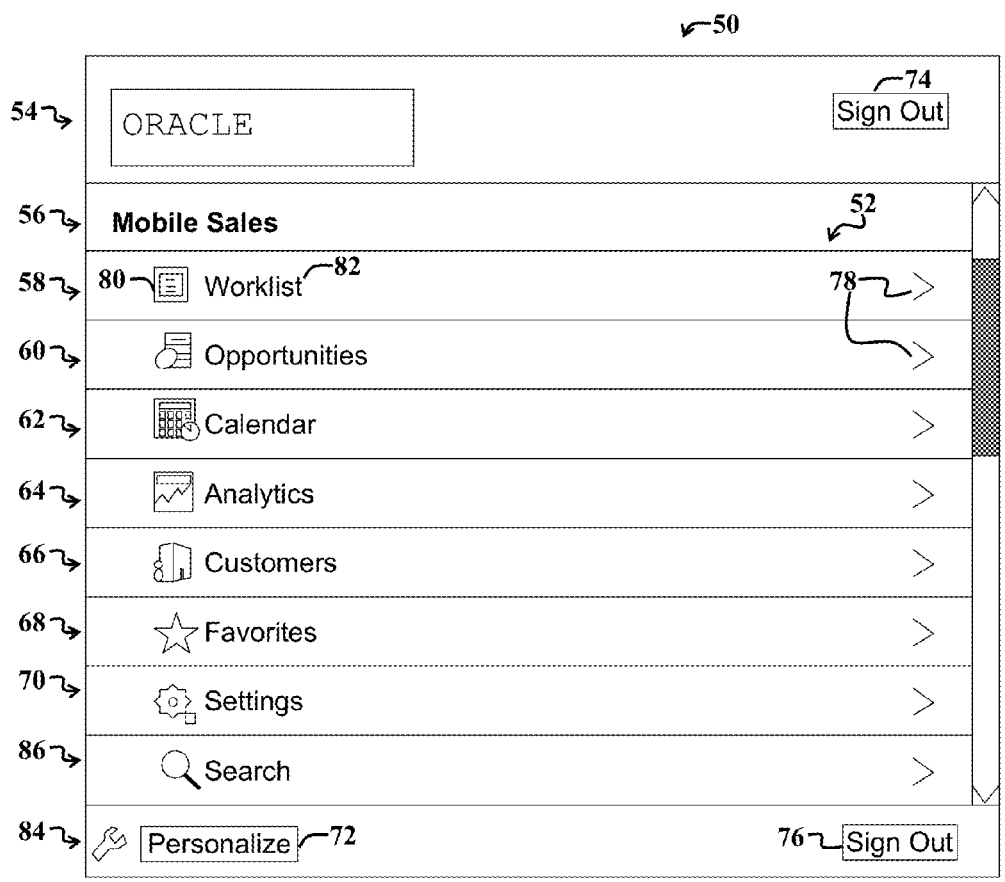
FIG. 2a is a diagram illustrating a first example primary display screen of a first embodiment of a mobile design pattern.

FIG. 2a is a diagram illustrating a first example primary display screen 50 of a first embodiment of a mobile design pattern, also called a user interface template or simply template. For the purposes of the present discussion, a user interface template may be any pattern or layout used to describe or depict how data and/or functionality is displayed via an application and/or accessed by a user via the application. The terms "pattern" and "template" are employed interchangeably herein. A mobile design pattern may be any pattern or template that is specifically adapted for use with a mobile computing device, such as a wireless phone and/or pocket Personal Computer (PC). Note that a particular component of a design pattern, such as a component defining the layout or organization of data and functionality on a single user interface screen, may also be considered a design pattern, as may a collection of such components that are designed to work together.

In the present example embodiment, the primary display screen 50 illustrates functionality implemented via an example application, which organizes functionality in accordance with an underlying pattern. The display screen 50 includes a list 52 of user interface controls 58-70, 86 organized in rows. A header bar 56 indicates a name of the application, e.g., "Mobile Sales," and is positioned above the uppermost row of interface controls 58. Each set of user interface controls interface controls 58-70, 86 is associated with a different set of functionality.

For example, for illustrative purposes, the first set of controls 58 facilitates access to worklist functionality. A first set of controls 58 is shown including an icon 80 and accompanying identifier 82, also called a category label. The icon 80 and/or the identifier 82 may be selected to access other related user interface screens that form part of an underlying design pattern discussed herein. The remainder of the sets of controls 60-70, 86 also include corresponding icons and identifiers. Optional chevrons 78 are provided for accessing sub-lists or other related sets of controls and/or display screens.

A second example set of controls 60 facilitate user access to opportunities, such as functionality for organizing, documenting, and contacting persons associated with certain specified opportunities. A third set of controls 62 facilitates user access to calendar-based functionality. A fourth set of controls 64 facilitates user access to analytics functionality, such as functionality used to analyze data, plot graphs, depict sales patterns, and so on. Note that analytics may also include certain calendar-based, map-based, and other types of functionality to facilitate analysis of data. A fifth set of controls 66 facilitates user access to customer functionality, such as functionality used to organize, augment, document, etc., information about customers. A sixth set of controls 68 facilitates user access to favorites functionality, such as functionality for enabling a user to mark certain objects, such as customer profiles, product descriptions, and so on, as favorites. A seventh set of controls 70 includes settings functionality, such as functionality for enabling a user to selectively affect or adjust functionality of the underlying application. An eighth set of controls 86 includes access to search functionality for searching and/or sorting and displaying results. Additional user options for adjusting settings or other characteristics or features of the underlying application may be accessed via a personalization control 72 positioned in an optional footer 84.

Note that the various sets of functionality 58-70, 86 are merely illustrative. More, fewer, and/or different sets of functionality may be employed other than the set 58-70, 86 shown in FIG. 2*a*, without departing from the scope of the present teachings. For example, a search field, search control, and/or sort control may be provided in the header bar 56 for facilitating cross-object searches and/or sorting operations. Furthermore, the screen 50 may have a scroll bar to enable scrolling to view additional sets of controls. Additional example sets of functionality may include shopping functionality for searching for and purchasing products or services; pictures functionality for cataloging and documenting photographs, and so on.

For the purposes of the present discussion, a cross-object search may be any search that queries different types or classes of objects. An object may be any grouping of functionality and/or data. Different types of objects may be associated with different types of functionality, such as functionality implemented by different modules of an application.

The first display screen 50 further includes sign-out options 74, 76, which are preferably positioned in the upper and lower right corners of the display screen 50. One or more of the sign-out options 74, 76 may be omitted without departing from the scope of the present teachings.

Figure 2B:
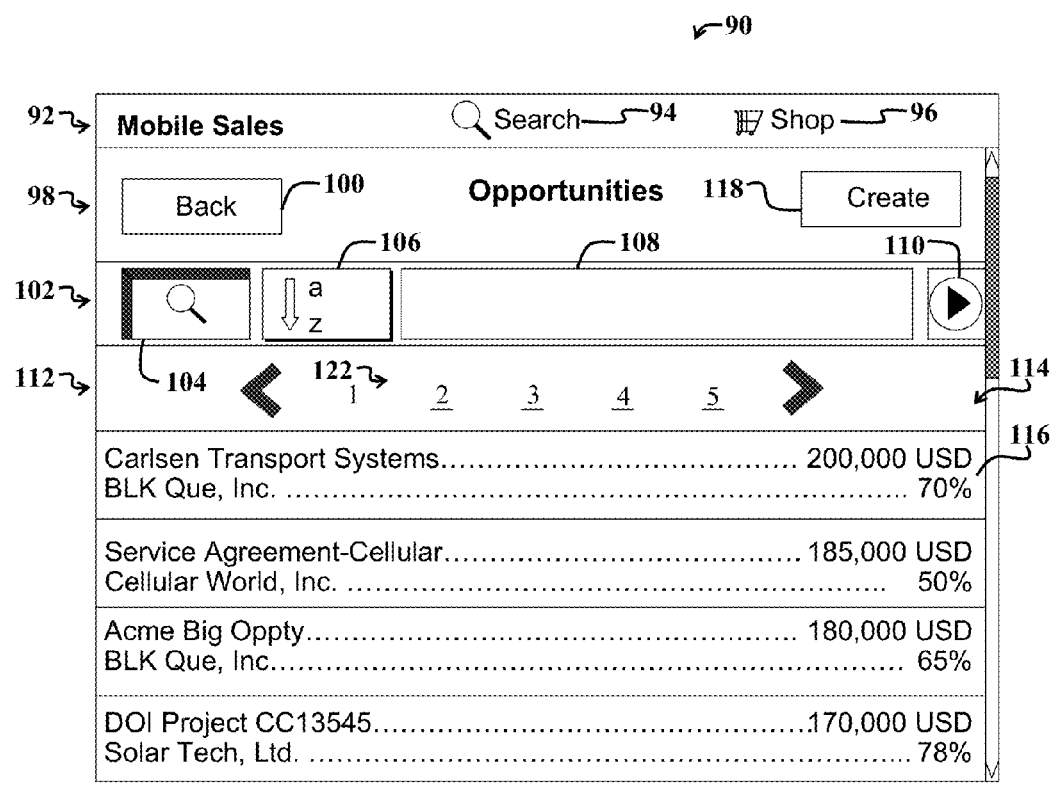

FIG. 2*b* is a diagram illustrating a second example display screen 90 that is accessible via the first display screen 50 of FIG. 2*a*. The second example user interface display screen 90 may be accessed via selection of one or more of the opportunities controls 60 of FIG. 2*a*.

The second display screen 90 includes a header bar 92 extending horizontally across the screen 90. The header bar 92 optionally specifies the title of the underlying software application and includes additional controls, such as a search control 94 for conducting global searches, and a shopping control 96 for accessing shopping functionality. Note that additional or fewer controls (or types thereof) may be included in the header bar 92 without departing from the scope of the present teachings.

The second display screen 90 further includes a navigation bar 98, which includes a category title "Opportunities," a back button 100 for returning to the previous display screen 50 of FIG. 2*a*, and a create button 118. User selection of the create button 118 may activate one or more additional display screens with functionality for enabling a user to create a new entry, i.e., object, to be categorized as an opportunity.

Additional navigation controls, such as a forward button, an edit-list button, and so on, may be provided in the navigation bar 98. The navigation bar 98 preferably extends horizontally across the second display screen 90 and is vertically adjacent to the header bar 92. For the purposes of the present discussion, a first bar or row is said to be vertically adjacent to a second bar or row if the first bar is positioned directly above or below and adjacent to the second bar or row.

An additional row of controls 102 is positioned below and vertically adjacent to the navigation bar 98. For illustrative purposes, the additional row of controls 102 is shown including a search button 104, a sort button 106, a search field 108, and an enter button 110. Note that the buttons 104, 106 may also be called icons or controls. For the purposes of the present discussion, a user interface control may be any mechanism, such as a graphical representation or field, used to facilitate access to functionality via a graphical user interface display screen. An icon represents a specific type of control implemented as graphical representation corresponding to a user-selectable region of a user interface display screen, where user selection of the icon may enable user access to functionality associated therewith. Note that if the search button 104 or the sort button 106 are selected, the appearance of the selected button changes (e.g., appears recessed or depressed) to indicate that the button has been selected.

An information display region 116 is shown including a list of example opportunities 114, which are organized in pages 122. Different pages of opportunities 114 may be changed via a page-control bar 112, which includes page-navigation controls. The page-control bar 112 is positioned above the list of opportunities 114.

In operation, a user may select the search button 104 and then enter data to be searched for, i.e., a query, in the search field 108. After entering search criteria (query) in the search field 108 and selecting the enter button 110, search results (such as opportunities 114) are displayed. The returned search results may be sorted in accordance with predetermined sorting options in response to user selection of the sort button 106. Note the search button 104 and the sort button 106 represent so-called search-sort toggle functionality, which is discussed more fully in co-pending U.S. patent application Ser. No. 12/792,571, entitled "SEARCH-SORT TOGGLE", filed Jun. 2, 2010, which is incorporated by reference herein.

Figure 2C:
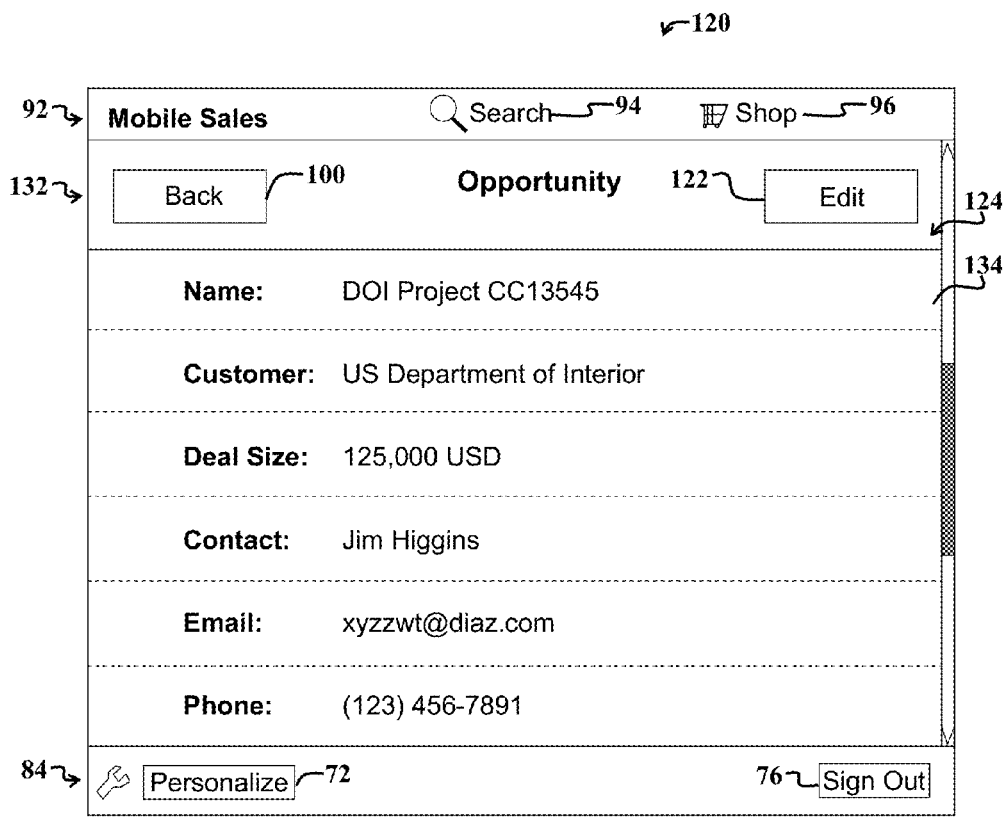
FIG. 2c is a diagram illustrating a third example display screen that is accessible via the second example display screen of FIG. 2b.

FIG. 2*c* is a diagram illustrating a third example display screen 120 that is accessible via the second example display screen 90 of FIG. 2*b*. The third display screen 120 may be accessed, for example, by selecting one of the opportunities 114 shown in the second display screen 90 of FIG. 2*b*.

The third display screen 120 includes the header 92 and an augmented navigation bar 132. The augmented navigation bar 132 is similar to the navigation bar 98 of FIG. 2*b* with the exception of an additional edit button 122 for editing information pertaining to a displayed opportunity object.

Selected opportunity object contents 124 appear in an object-information display region 134. The optional footer 84 is provided below and vertically adjacent to the object-information display region 134. For illustrative purposes, the footer 84 is shown including the personalization option 72 and sign-out option 76.

In the present specific embodiment, when a user selects the back button 100, the second display screen 90 of FIG. 2*b* is displayed in response thereto. If a user selects the edit button 122 followed by "Save" in a subsequent display screen (not shown), the first display screen 50 of FIG. 2*a* is then displayed. Selection of the edit button 122 activates an additional screen that is adapted to facilitate user modification of the information 124, i.e., object, corresponding to the selected opportunity.

Figure 3A:
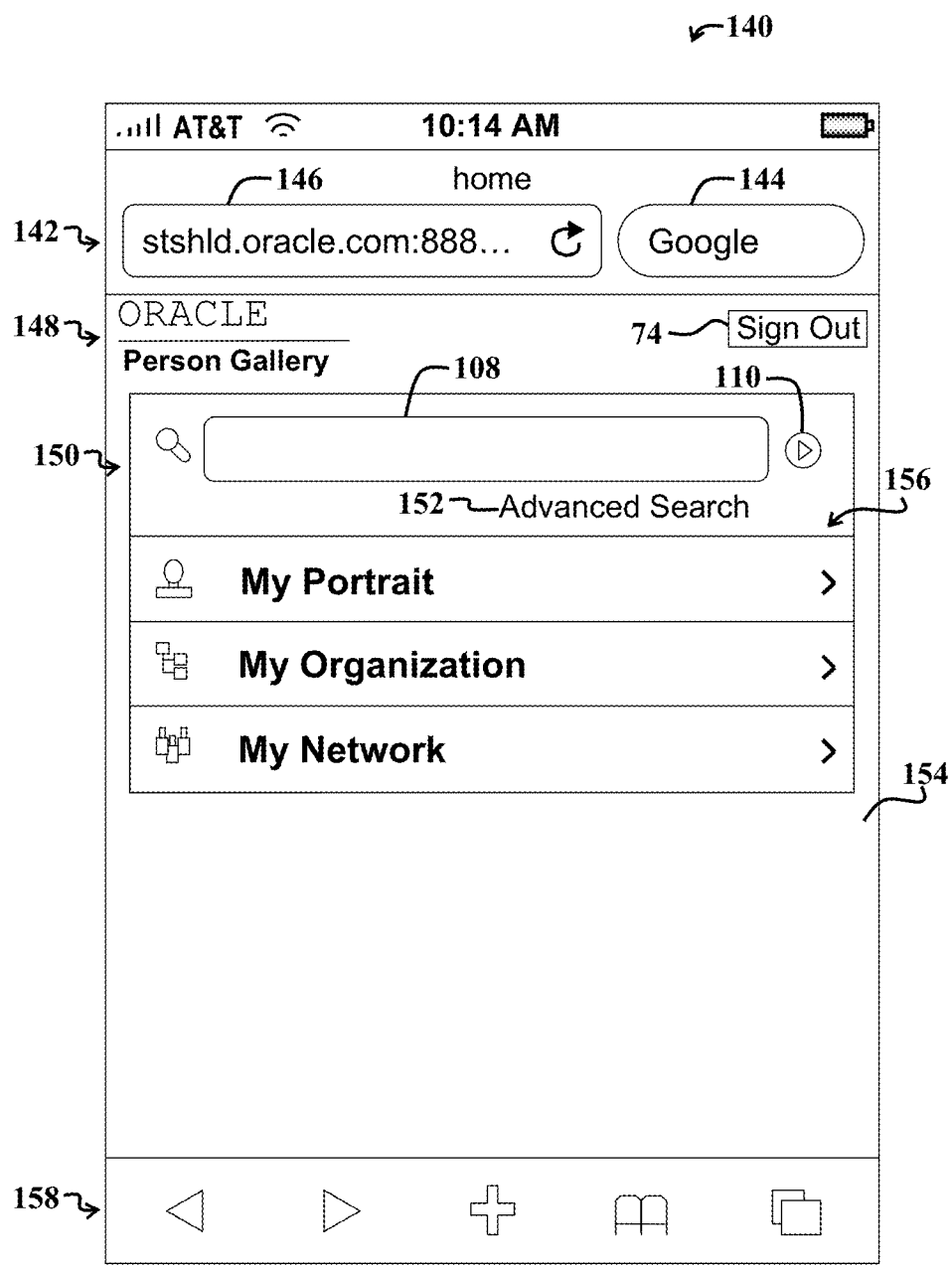
FIG. 3a is a diagram illustrating a first example display screen implementation of the mobile design pattern of FIG. 2a on an iPhone®.

FIG. 3*a* is a diagram illustrating a first example display screen implementation 140 of the mobile design pattern underlying the display screen 50 FIG. 2*a* approximately as might appear on an iPhone® display. Note that the software application used to generate the display screen 140 of FIG. 3*a* represents a different implementation than the software application used to generate the display screen 50 of FIG. 2*a*. However both applications adhere to an underlying design pattern involving a list of functionality and one or more header and footer bars as disclosed herein.

The example iPhone® display screen 140 includes a browser bar 142, which is adapted to enable a user to enter a Uniform Resource Locator (URL) in a URL field 146 to access the underlying application via the Internet. The browser bar 142 further includes an Internet search button 144 for facilitating conducting Internet-based searches. Various design elements, e.g., the search button 144 and URL field 146, shown in the browser bar 142, may currently exist in certain software products used by Apple Inc., such as the iPhone® mobile web browser.

A header bar 148 extending across the screen 140 includes the optional sign-out control 74 and header indicia indicating that person-gallery functionality is being accessed. A search bar 150 is positioned below the header bar 148. The search bar 150 includes the search field 108 and an adjacent enter button 110, also called a "go" button. An advanced-search-options link 152 for accessing advanced search options is also shown in the search bar 150.

A list of functionality 156 is provided in an information-display region 154 below the search bar 150. A browser footer 158 is also shown.

Note that while the display screen implementation 140 is generated by a browser-based implementation of underlying software in accordance with design patterns discussed herein, other types of implementations are possible. For example, the underlying software may be adapted to run outside of a browser as a stand-alone client-side application.

Figure 3B:
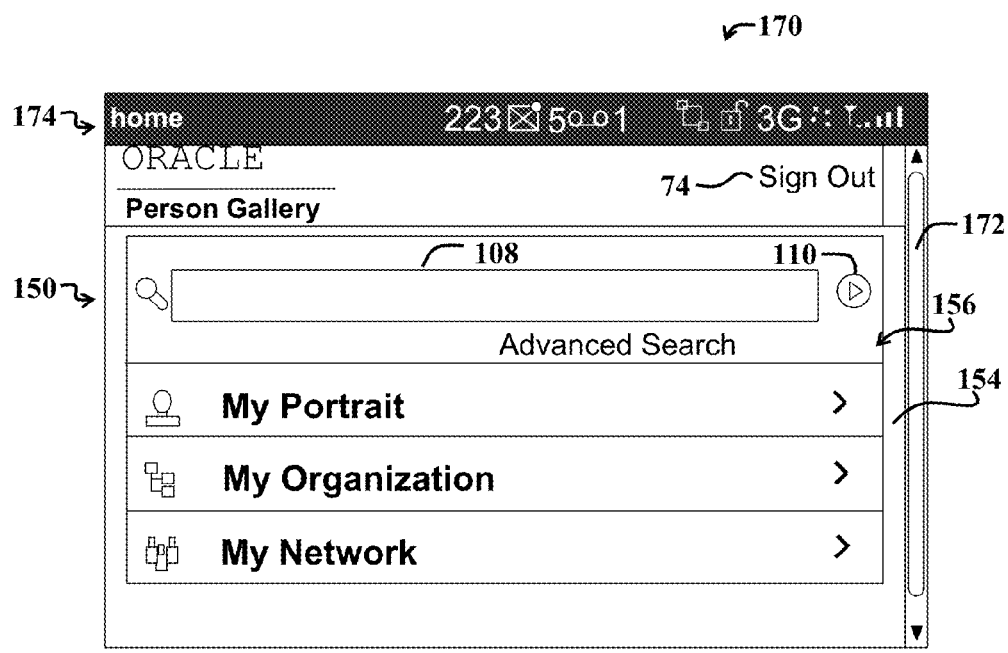
FIG. 3b is a diagram illustrating a second example display screen implementation of the mobile design pattern of FIG. 2a on a BlackBerry® device.

FIG. 3b is a diagram illustrating a second example display screen implementation 170 (of the mobile design pattern used by the person-gallery application of FIG. 2a) on a BlackBerry® device display. The display screen 170 of FIG. 3b is similar to the display screen of FIG. 3a with respect to the display of application content, with the exception that a scroll bar 172 is provided for use with the smaller display screen 170 on a BlackBerry® device. For illustrative purposes, various BlackBerry® icons 174 are shown at the top of the display screen 170. Furthermore, the scroll bar 172 is a preexisting feature of the mobile web browser used in various BlackBerry® devices.

Note that the design patterns discussed herein, and exemplified by various display screens discussed herein, work to facilitate efficient access to information regardless of the mobile computing device used. In general, each design pattern will be implemented on each device to ensure a desired user experience. Specific implementation details may be implementation specific. Note, for example, when using an iPhone®, a back button may appear in the display of a given pattern implementation, whereas when using a BlackBerry®, a hard key could be used in place of the back button. Certain key functionality discussed herein resides in the patterns and associated layouts depicting a framework for rendering user interfaces and underlying functionality.

Figure 4A:
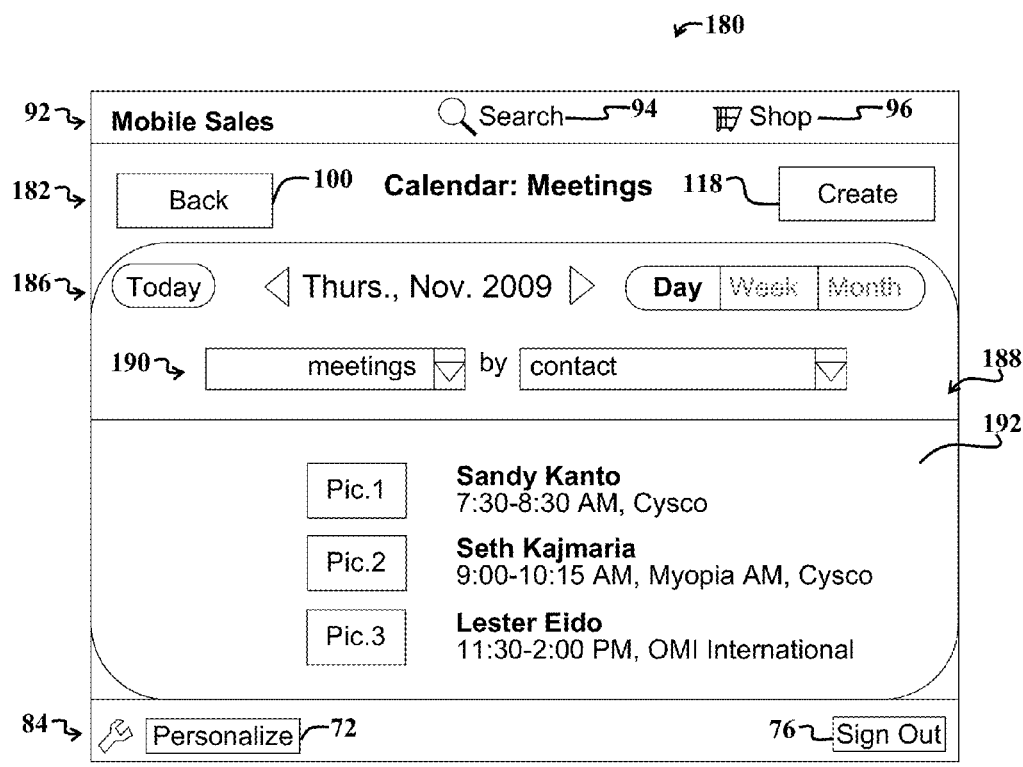

FIG. 4a is a diagram illustrating a fourth example display screen 180 that is accessible via the first display screen 50 of FIG. 2a by selecting one of the calendar controls 62 thereof. The fourth example display screen 180 includes the header 92 and footer 84. A calendar-meetings navigation bar 182 indicates that the display screen 180 is adapted to facilitate user access to functionality for organizing, documenting, and accessing information pertaining to meetings with reference to calendar information, as indicated by the title "Calendar: Meetings" specified in the navigation bar 182.

The navigation bar 182 further includes the back button 100 for returning to the display screen 50 of FIG. 2a, and a create button 118 for facilitating creation of a new meetings object. Note that the create button 118 may be replaced with an edit button; an edit button may be provided in addition to the create button 118; the create button 118 and edit button may be omitted; the create button 118 may be replaced with a drop down menu with additional options for creating objects, editing objects; and so on. The exact functionality to be provided in a given implementation is implementation specific and depends upon the needs of a given application. Those skilled in the art with access to the present teachings may readily determine, without undue experimentation, appropriate functionality to provide in accordance with one or more design patterns disclosed herein.

A calendar navigation bar 186 is positioned below the calendar-meetings navigation bar 182. The calendar navigation bar 186 provides various controls for adjusting content 188 to be displayed in an information-display region 192 in accordance with a particular day, week, or month.

Additional drop-down menu controls 190 are provided below the calendar navigation bar 186. The drop-down menu controls 190 are adapted to enable a user to further adjust the displayed content 188 based on display criteria provided in the drop-down menu controls 190, as discussed more fully below.

In the present example display screen 180, the content 188 lists scheduled meetings displayed in combination with contact information for meeting attendees.

Figure 4B:
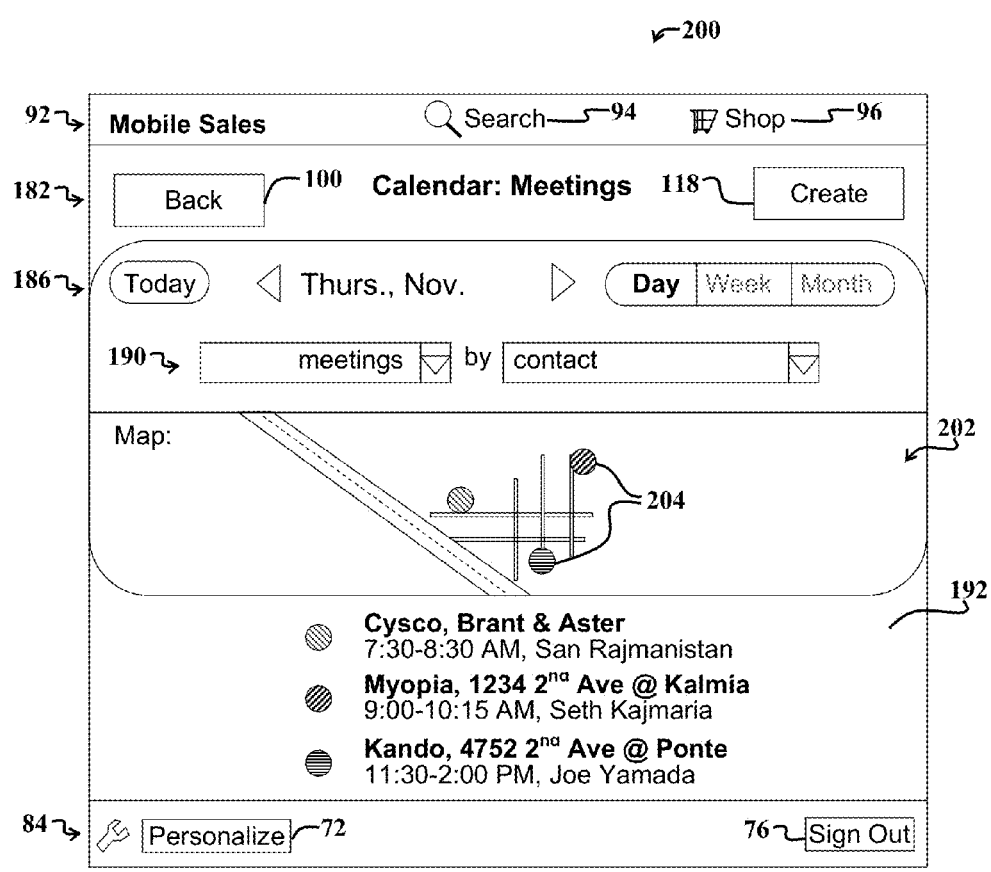

FIG. 4b is a diagram illustrating a fifth example display screen 200 that is accessible via the fourth example display screen 180 of FIG. 4a. The fifth example display screen 200 is similar to the fourth example display screen 180 with the exception that the drop-down menu controls 190 have been adjusted to display meeting information in accordance with meeting location information.

For illustrative purposes, the information-display region 192 is shown including meeting information 202, which is graphically displayed, such as by locations 204 on a map in combination with listings of locations and corresponding addresses. Displayed meeting locations 204 may be color coded to corresponding listed meeting-location information.

Note that additional options for displaying, sorting, and augmenting meeting information may be provided without departing from the scope of the present teachings. For example, the drop-down menu controls 190 may include further options to display meeting information in accordance with predetermined tags; in accordance with scheduled meeting duration, and so on. Furthermore, additional calendar-related information other than meetings may be displayed using similar underlying design patterns. For example, the drop-down menu controls 190 may be adjusted to display expense information categorized by associated employee; deal closings may be displayed according to dates associated with the deal closings, and so on.

FIG. 5a is a diagram illustrating a sixth example display screen 210 that is accessible via the second example display screen 90 of FIG. 2b after create functionality is activated therefrom, e.g., via selection of the create button 118 thereof.

The sixth example display screen 210 includes the header 92. Although a footer is not shown, a footer may also be provided without departing from the scope of the present teachings. The sixth example display screen 210 is adapted to provide user access to functionality for entering information pertaining to an opportunity, i.e., opportunity-object information.

Figure 5B:
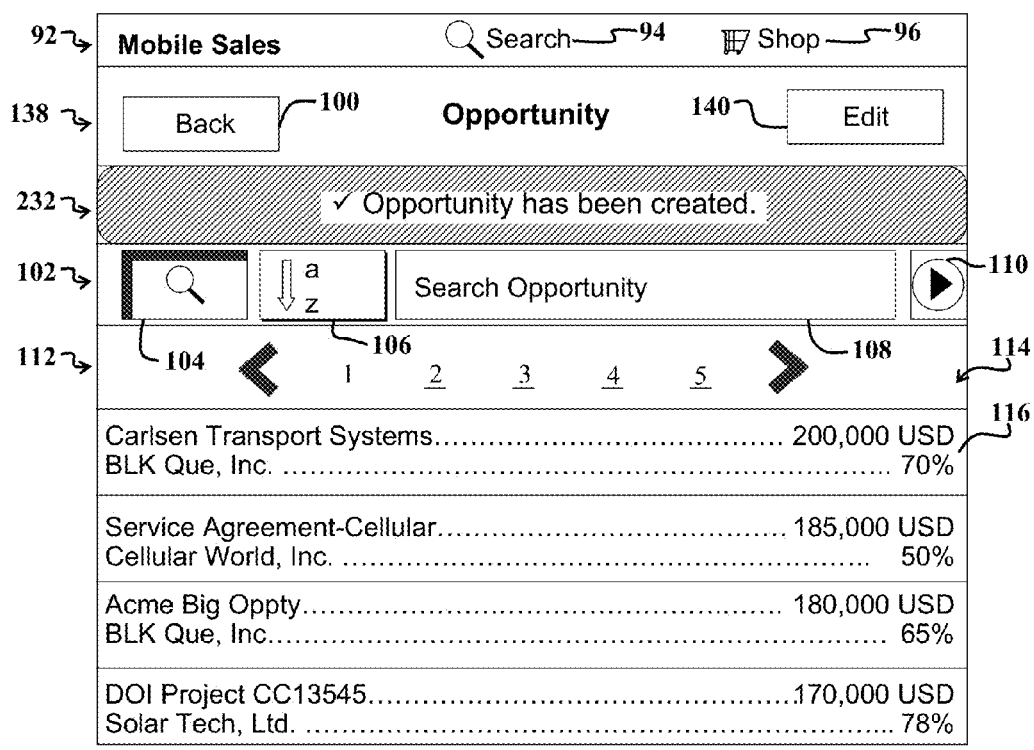
FIG. 5b is a diagram illustrating a seventh example display screen resulting from the sixth example display screen of FIG. 5a and illustrating a notification band that provides status information pertaining to creation of an object.

Various fields and controls 218 are provided for facilitating entering opportunity-object information in an information-display region of the sixth example display screen 210. After desired information is entered in the various controls 218, a save button 214 in a navigation bar 212 may be selected, thereby saving the associated opportunity object. Subsequently, with reference to FIG. 5b, a corresponding notification band 232 is displayed along with an updated version 230 of the sixth example display 210 of FIG. 5a. The example display 230 of FIG. 5b is called the seventh example display screen herein.

With reference to FIG. 5a, additional controls are provided below the information display region 216, such as a more bar 220 and accompanying chevron 224 and a notes bar 222 with an accompanying add icon 226 and note-count indicator 228. The more bar 220 may facilitate user access to additional controls, e.g., fields, for entering additional information pertaining to an opportunity or otherwise selecting additional predetermined options. The more bar 220 may be omitted without departing from the scope of the present teachings.

Upon creation of a given opportunity, and before a note pertaining to an opportunity is created, the note-count indication 228 will indicate zero. The add icon 226 may be selected to activate an additional user interface screen for adding a note.

Figure 5C:
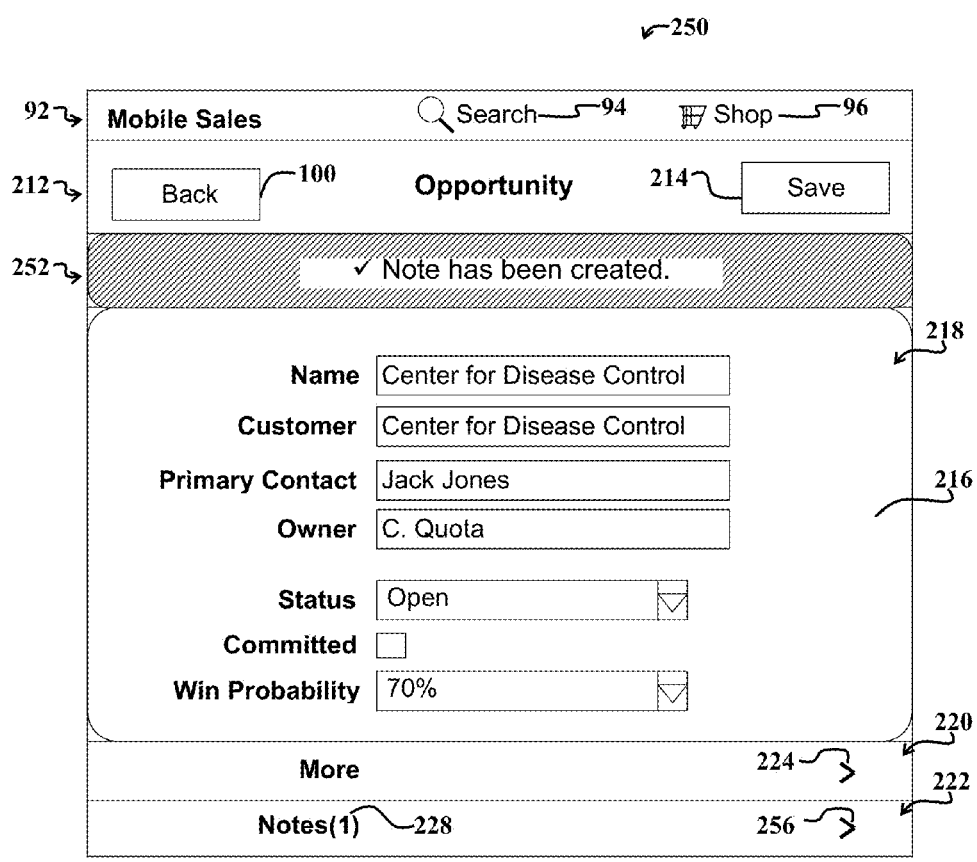
FIG. 5c is a diagram illustrating an eighth example display screen resulting from the sixth example display of FIG. 5a after a note has been created and illustrating a corresponding notification band.

With reference to FIG. 5c, after the corresponding note is saved, a corresponding notification bar 252 is displayed along with an updated version 250 of the sixth example display 210 of FIG. 5a. A note added in association with a given opportunity object is considered to be a child object of the given opportunity object.

The example display screen 250 of FIG. 5c is called the eighth example display screen herein. The note-count indication 228 has been updated in FIG. 5c to show that a note has been added. Furthermore, for illustrative purposes, the add icon 226 is replaced with a chevron 256 for facilitating access to the associated note. However, the add icon 226 may persist in combination with the chevron 256 without departing from the scope of the present teachings.

In the present embodiment, when a user selects the chevron 256, an additional user interface display screen appears, which lists notes and provides one or more controls (and/or additional display screens) for adding additional notes, i.e., child objects, to one or more opportunity objects as desired. The note-count indication 228 is adjusted as additional notes are added and/or removed.

Figure 6A:
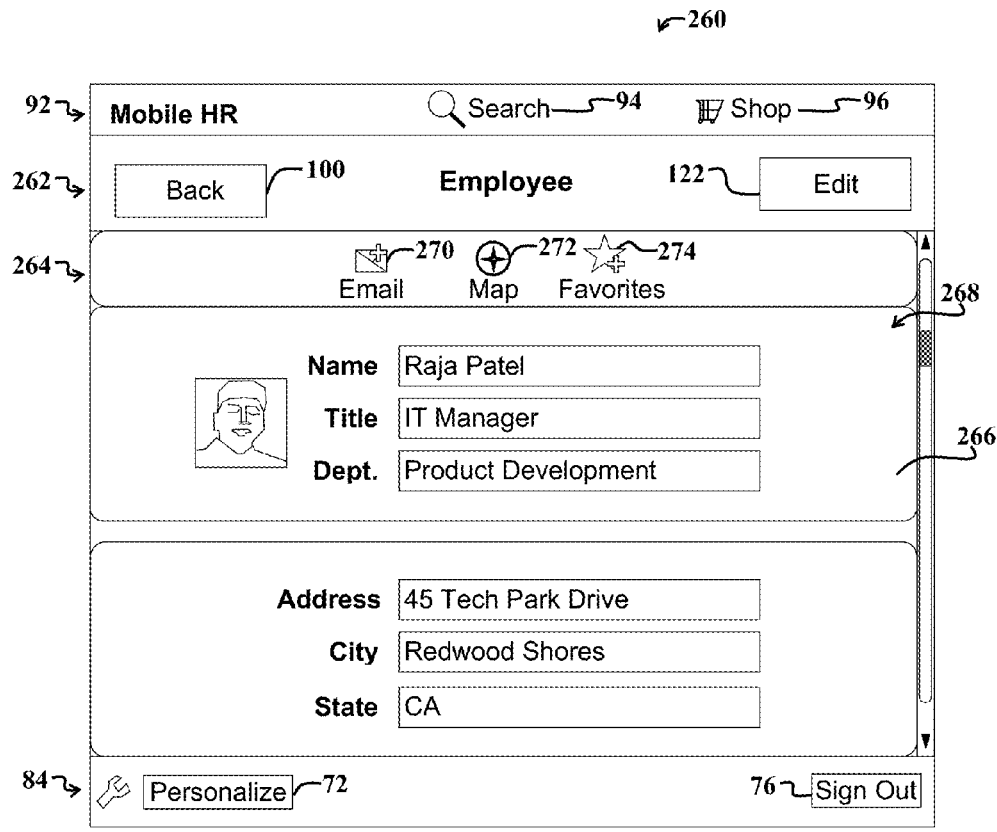
FIG. 6a is a diagram illustrating a ninth example display screen that is accessible via the first example display screen of FIG. 2a and further illustrating a band of icons, including a favorites icon.

FIG. 6a is a diagram illustrating a ninth example display screen 260, which is accessible via the first example display screen 50 of FIG. 2a and further illustrating a band of icons 264, including a favorites icon 274. Note that the band of icons 264, which may also be called a header toolbar, may include controls other than icons without departing from the scope of the present teachings.

The ninth example display screen 260 may be accessed, for example, via selection of an employee control (not shown) in the list of controls 52 of FIG. 2a. The optional footer is provided 84 with the personalization option 72 and the sign-out option 76. The example header 92 is also shown.

The band of icons 264 is positioned below and vertically adjacent to an employee navigation bar 262. The so-called employee navigation bar 262 indicates that employee functionality is provided via the display screen 260, i.e., functionality for documenting, augmenting, editing, adding, and so on, information pertaining to employees, i.e., employee objects. The navigation bar 262 includes the back button 100 for returning to the display screen 50 of FIG. 2a or another display screen as desired.

The navigation bar 262 further includes an edit button 122. The edit button 122 of the navigation bar 262 is adapted to activate (in response to user selection thereof) one or more additional display screens with one or more controls for editing information, such as employee information 268 displayed in an employee information-display region 266 of the display screen 260.

For illustrative purposes, the band of icons 264 is shown further including an email icon 270, for facilitating accessing email functionality and composing emails to send to a given employee; a map icon 272, for facilitating accessing mapping functionality, such as to map an address associated with a given employee; and the favorites icon 274, for facilitating enabling a user to selectively mark an employee object as a favorite. For example, user selection of the favorites icon 274 facilitates marking the employee object 268 corresponding to Raja Patel, as a favorite, as discussed more fully below with reference to FIG. 6b.

Figure 6B:
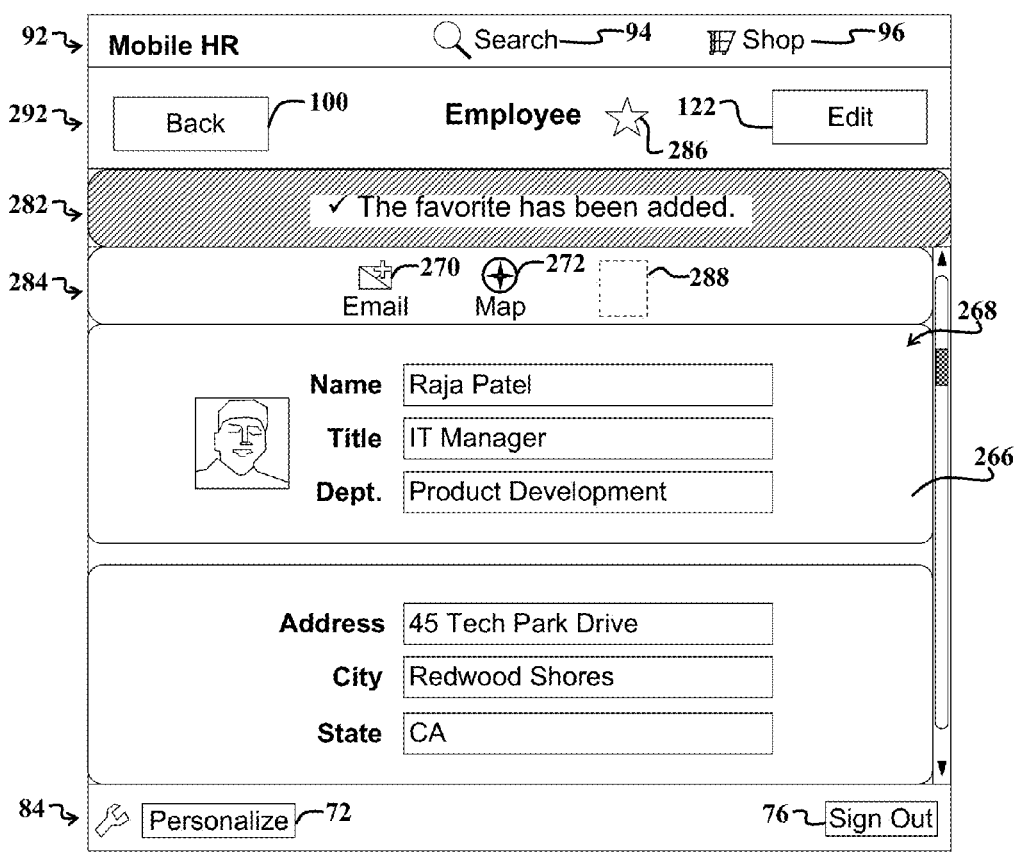
FIG. 6b is a diagram illustrating a tenth example display screen resulting after selection of the favorites icon from the ninth example display screen of FIG. 6a and illustrating a corresponding notification and adjustment to the band of icons.

FIG. 6b is a diagram illustrating a tenth example display screen 280 resulting after selection of the favorites icon 274 from the ninth example display screen 260 of FIG. 6a and illustrating a corresponding favorites notification 282 and adjustment 288 to the band of icons 264 of FIG. 6a.

With reference to FIGS. 6a and 6b, upon user selection of the favorites icon 274 of FIG. 6a, the employee object 268 is marked as a favorite via the addition of a favorites symbol 286 adjacent to the "Employee" indicia in the navigation bar 292 of FIG. 6b. Furthermore, the favorites notification band 282 appears in the display screen 280 indicating that the displayed employee object 268 has been marked as a favorite, i.e., that a favorite employee has been added to the favorites category. In general notification bands, such as the notification band 282 may indicate when an object or information associated therewith had been created, deleted, updated, market, and so on.

The band of icons 264 of FIG. 6a is replaced with the band of icons 284 of FIG. 6b. The band of icons 284 of FIG. 6b is similar to the band of icons 264 of FIG. 6a with the exception that the favorites icon 274 of FIG. 6a is removed in FIG. 6b, leaving an empty space 288. Hence, the favorites icon 274 of FIG. 6a is selectively omitted according to the status of the displayed object 268. In the present example, since the employee object 268 has been marked as a favorite, the favorite icon 274 of FIG. 6a is no longer needed. The disappearance of the favorites icon 274 is considered to represent an example of a changing of appearance of an icon in response to or based on user selection thereof. Note that the employee object 268 may be removed from a favorites list, such as via functionality that appears in response to selection of the edit button 214 or functionality accessible by selecting one of the favorites controls 68 of the first user interface display screen 50 of FIG. 2a.

Figure 6C:
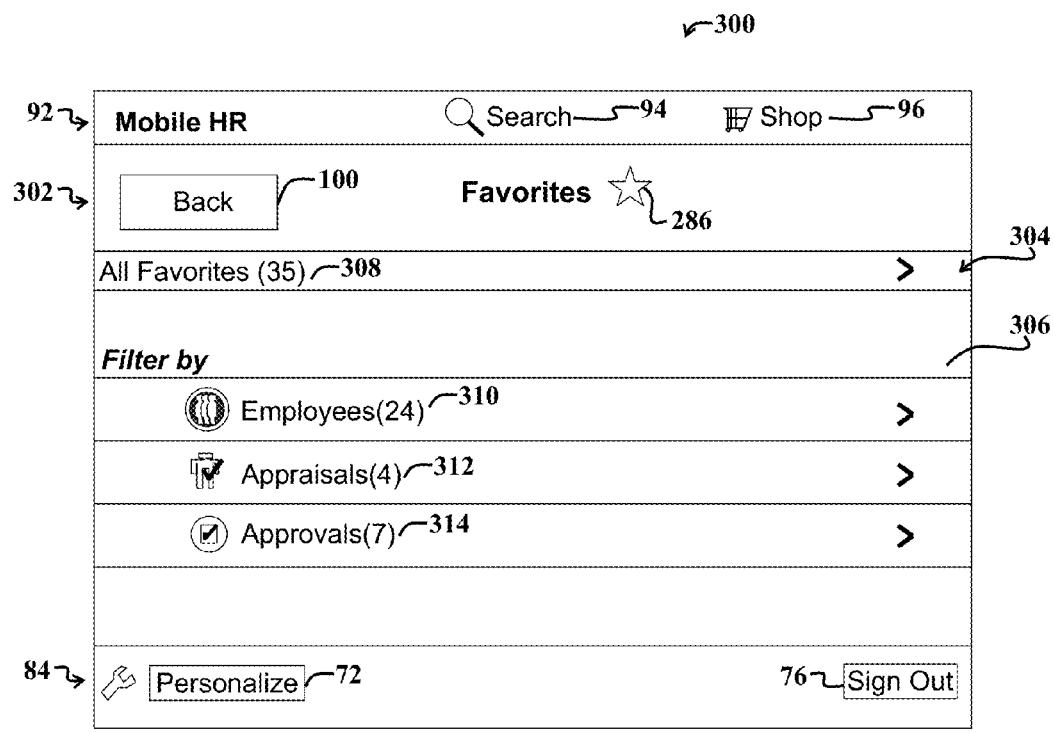

FIG. 6c is a diagram illustrating an eleventh example display screen 300. The eleventh example display screen 300 is accessible from the first example display screen 50 of FIG. 2a, such as via selection of one of the favorites controls 68 thereof. After an object, such as an employee object or an opportunity object, is marked as a favorite, functionality associated with the object may be further accessible via favorites functionality associated with the favorites controls 68 of FIG. 2a. The eleventh example display screen 300 illustrates an example set of controls for facilitating access to favorites functionality.

The eleventh example display screen 300 includes an example favorites navigation bar 302 with the back button 100, a title indicating "Favorites," and a favorites indicator 286. Various controls 304 are provided in a display region 306. The controls 304 include a first link 308 for facilitating access to a listing of all objects that have been marked as favorite. The favorites may also be accessible by object type. For example, favorite employees may be accessed via a favorite employee link 310; favorite appraisals may be accessed via a favorite appraisals link 312; and favorite approvals may be accessed via an approvals link 314.

For example, upon selection of the employee link 310, another screen (not shown) may appear that provides a list of links associated with different employees that have been marked as favorites. The screen may have search/sort toggle functionality. Each listed employee link may facilitate activation of a corresponding screen. The activated employee screen may be similar to the display screen 280 of FIG. 6b, with the exception that the notification bar 282 of FIG. 6b may be removed.

With reference to FIGS. 6b and 6c, after the employee object 268 has been marked as a favorite, it will then appear among the favorites accessible via the favorites link 308 and the favorite employees link 310 of FIG. 6c.

Figure 7:
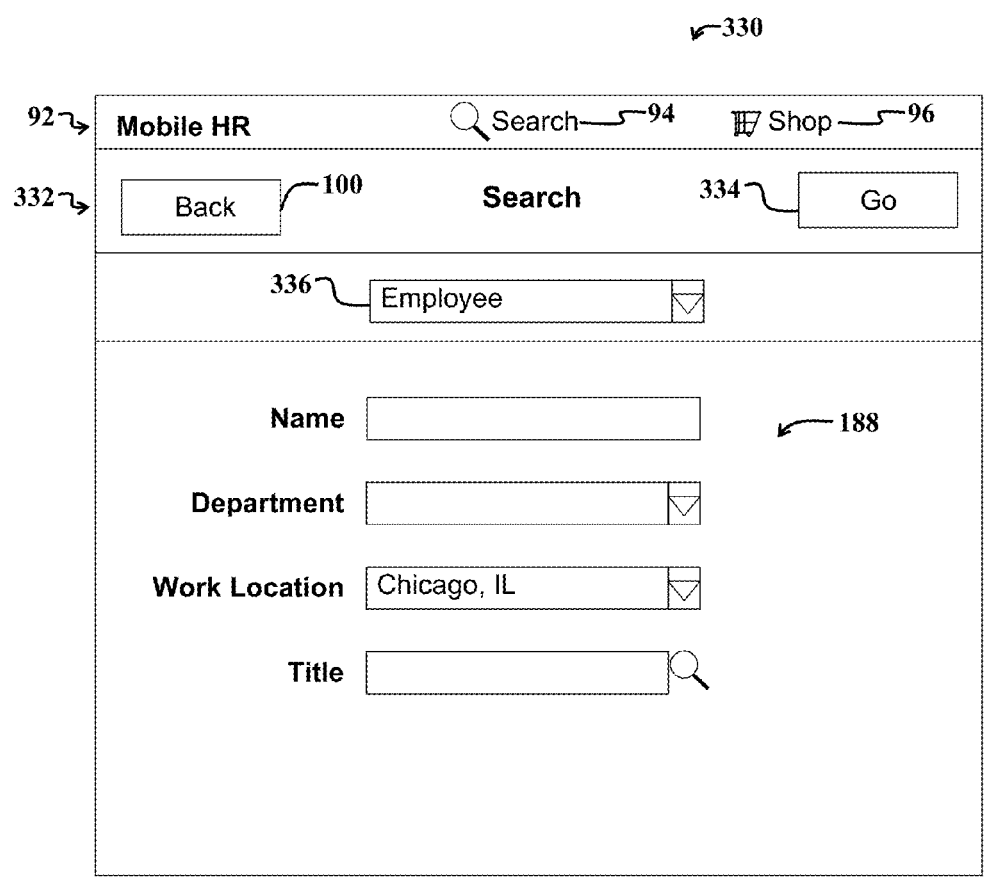
FIG. 7 is a diagram illustrating a twelfth example display screen for implementing a search according to object-type, wherein the twelfth example display screen is accessible from the second example display screen of FIG. 2b after selection of a search control.

FIG. 7 is a diagram illustrating a twelfth example display screen 330 for implementing a search according to object-type. The twelfth example display screen 330 may be accessible (for example) from the second example display screen 90 of FIG. 2b, such as via selection of the search control 94 thereof.

The twelfth example display screen 330 includes a search navigation bar 332, with an optional back button 100, go button 334, and display screen title indicating "Search." In the present example embodiment, the display screen 330 is adapted to facilitate an object search. The display screen 330 provides an optional object picker 336. The particular object that is selected via the object picker 336 may affect various search fields and controls 188 displayed in response thereto.

For illustrative purposes, the object picker 336 has been used to select "Employee." Accordingly, various fields and controls 188 facilitate entering search criteria, such as name, department, work location, and title to facilitate implementing a query limited to employee objects.

Note that the object picker 336 may include a "cross-object" option for facilitating implementing cross-object searches, i.e., searches among all objects that are accessible via the software underlying the user interface display screen 330.

Figure 8A:
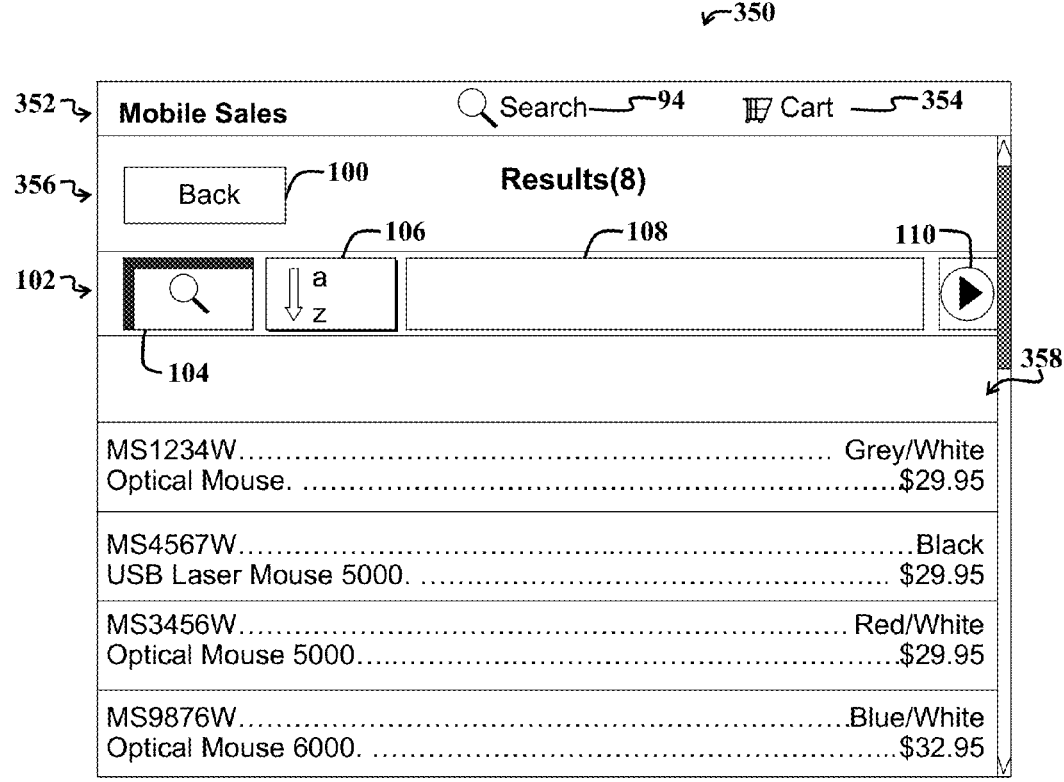
FIG. 8a is a diagram illustrating a thirteenth example display screen accessible via the first display screen of FIG. 2a illustrating sorted search results of items available for purchase.

FIG. 8a is a diagram illustrating a thirteenth example display screen 350, which may be accessible after execution of a search after activation of search functionality from one of the display screens of FIGS. 1-7. For example, the search controls 86 of FIG. 2a (and/or the search controls 94 of FIGS. 2-8) may be selected to facilitate access to functionality provided via the thirteenth example display screen 350 of FIG. 8a.

The thirteenth example display screen 350 illustrates search results 358 of items in response to a shopping query for products available for purchase. The search results 358 may be sorted in accordance with a predetermined criterion via the search button 106. The criterion for sorting may be entered in the field 108. The search button 104, toggle button 106, and field 108, and enter button 110 are provided in the row of controls 102.

The display screen 350 includes a header 352, which includes the search control 94 and a shopping cart control 354 for accessing a shopping cart, as discussed more fully below. The display screen 350 further includes a shopping search results navigation bar 356 entitled "Results(8)" indicating that eight search results for a given shopping query were returned and displayed among the results 358. The navigation bar 356 is positioned between the header 352 and the row of controls 102 and is vertically adjacent thereto.

An additional row of controls 102 includes the search toggle button 104, the sort toggle button 106, the search field 108, and an enter button 110. The sort toggle button 106 may be used to selectively sort the displayed results 358 in accordance with predetermined criteria, as may be entered in the field 108. Upon user selection of one of the results 358, the fourteenth display screen 370 of FIG. 8b is displayed.

Figure 8B:
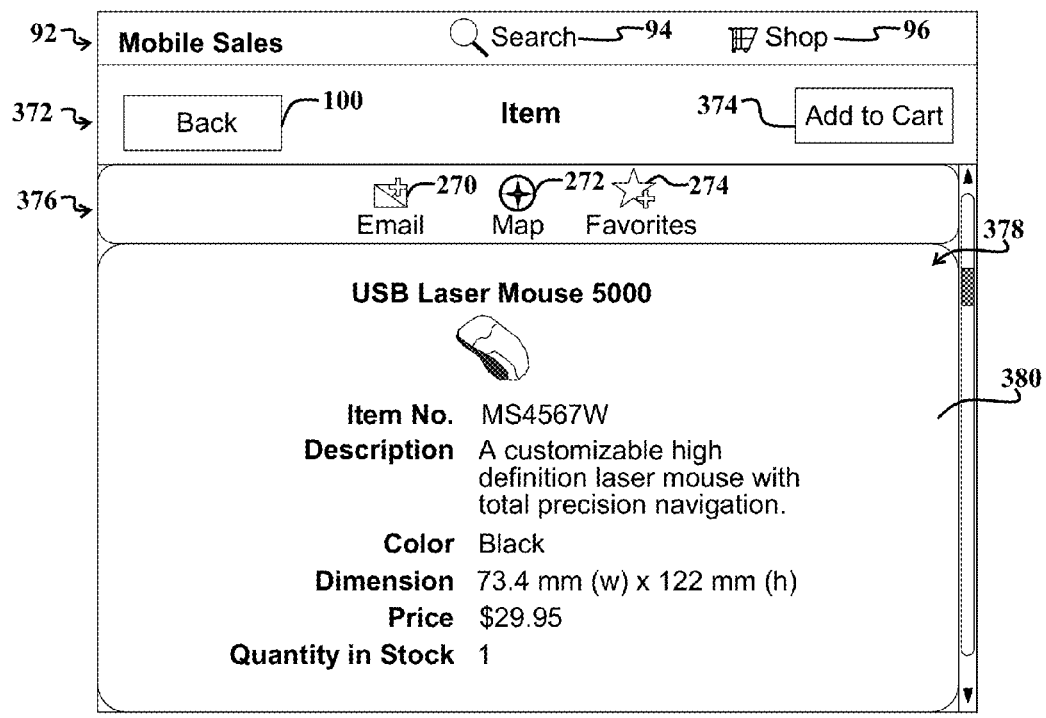
FIG. 8b is a diagram illustrating a fourteenth example display screen accessible via the thirteenth example display of FIG. 8a, wherein the fourteenth example display illustrates a product object.

FIG. 8b is a diagram illustrating a fourteenth example display screen 370, which is accessible via the thirteenth example display screen 350 of FIG. 8a. The fourteenth example display screen 370 illustrates a product object 378, which includes information descriptive of a selected product. The display screen 370 includes the header 92, a shopping-item navigation bar 372, a band of icons 376, and information pertaining to the selected product 378, which is displayed in a shopping-item information display region 380.

A user may mark the shopping object as a favorite; may select the product 378 for an express order; may email the product information, and so on, via one or more of the icons 376. The shopping-item navigation bar 372 includes the back button 100 for returning to one or more previously displayed screens and further includes an add-to-cart button 374. The add-to-cart button 374 is adapted to place the displayed product 378 to a shopping cart upon selection of the button 374. A subsequently displayed shopping cart may include similar headers, navigation bars, and/or icons arranged similarly to the fourteenth display screen 370. Similarly, a notification band may be displayed indicating that a given product has been added to a shopping cart.

An example generalized method that may be employed to facilitate implementing embodiments of software in accordance with various design patterns discussed herein includes: investigate information pertaining to the intended use of the software and those likely to use the software; define essential mobile task(s); eliminate or minimize non-essential tasks; employ conceptual design using available technologies, such as GPS; minimize time necessary to complete tasks; employ business intelligence as needed, e.g., analytics, while minimizing unnecessary analytics; if search options are desired, implement simple search options, i.e., search options that are quickly accessible; embed collaboration tools as needed, e.g., a control for sending email, placing calls, providing access to social networks, etc.; consider providing progressive disclosure of information and limiting information displayed at once, while concisely stating or summarizing information; and leverage the mobile platform, e.g., by providing the ability to offer browser-accessible and/or native applications and associated functionality.

While certain design patterns and accompanying example layouts are discussed with reference to certain rows that extending across a user interface display, embodiments are not limited thereto. For example, rows may be replaced with segments, columns, partial rows, or partial columns in certain implementations without departing from the scope of the present teachings. Furthermore, the term "row" is taken to include user interface features that are included in a horizontal partition of a user interface display screen. Note however, that contents of a row need not extend entirely across a display for the contents to be considered as forming a row or being included in a row. For example, a set of buttons may be included in a row, but the buttons need not occupy all of the horizontal space in a given horizontal partition of the display area. Furthermore, a row need not have a visible line or other graphical boundary delineating a horizontal partition comprising the row boundaries.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system including one or more processors, for creating one or more user interface display screens providing interaction with an enterprise application, with the user interface screens for display on a device display of a portable electronic device, the method comprising:
selecting, in response to user input and using the one or more processors, one or more mobile design patterns for incorporation into a generated software application for use on user interface hardware on the portable electronic device to display a first user interface display screen on the device display, with the first user interface display screen
depicting a list of user interface controls organized in rows, wherein each row in the list includes a different set of one or more controls, wherein each different set of one or more controls is associated with a different set of functionality provided by one or more additional user interface display screens;
generating feedback, using the one or more processors, based on a response to the first user interface display screen by one or more simulated user personas; and
generating, using the one or more processors, an overall score for the first user interface display screen indicating whether the first user interface screen meets predetermined criteria associated with the one or more simulated user personas.

2. The method of claim 1 wherein a simulated user persona may represent a field sales representative, a filed service technician, a retail merchandiser, a manager or a generation Y user.

3. The method of claim 1 wherein a second user interface display screen is accessible via the one or more of the different sets of one or more controls and where the second user interface screen includes:
a navigation bar that includes one or more navigation controls and a title identifying a set of functionality associated with the different set of one or more controls; and an information-display region adapted to display data associated with the set of functionality, wherein the information-display region is below the navigation bar so that the navigation bar does not obscure any part of the information-display region, wherein the second band of controls includes one or more icons or buttons associated with one or more functions of the set of functionality.

4. The method of claim 3 wherein a mobile design pattern is adapted to selectively change, add, or omit an icon from the second band of controls according to a status of a function associated with the icon.

5. The method of claim 3 wherein the one or more icons includes a search icon and a sort icon.

6. The method of claim 5 wherein the search icon and the sort icon are adapted to change appearance in response to user selection thereof.

7. The method of claim 5 wherein the second band of controls includes a search field adapted to facilitate searching data and displaying search results in the information-display region in response thereto.

8. The method of claim 5 wherein the second band of controls includes a favorites icon that is adapted to associate displayed data with indicia indicating a user favorite.

9. The method of claim 1 wherein a second user interface display screen further includes a notification band that is adapted to provide status information pertaining to functionality accessed by a user.

10. The method of claim 9 wherein the status information includes an indication that information has been updated or that an object has been created, deleted, or updated.

11. The method of claim 1 wherein first user interface display screen further includes a personalization control and a sign-out control for providing a personalization option and a sign-out option, respectively.

12. The method of claim 1 wherein the first user interface display screen includes a first row with a control for accessing a worklist.

13. The method of claim 1 wherein the first user interface display screen includes a second row with a control for accessing functionality for managing information pertaining to opportunities.

14. The method of claim 1 wherein the first user interface display screen includes a second row with a control for accessing functionality for managing information in association with a calendar.

15. The method of claim 14 wherein the information in association with a calendar includes information pertaining to scheduled meetings.

16. The method of claim 14 wherein the information in association with a calendar includes information pertaining to expenses.

17. The method of claim 14 wherein the information in association with a calendar includes deal closings.

18. The method of claim 14 wherein the information in association with a calendar includes sales information.

19. An apparatus for creating one or more user interface display screens providing interaction with an enterprise application, with the user interface screens for display on a device display of a portable electronic device, the apparatus comprising:
- a digital processor coupled to a device display and to a processor-readable storage device, wherein the processor-readable storage device includes one or more instructions executable by the digital processor to perform the following acts:
- selecting, in response to user input and using the one or more processors, one or more mobile design patterns for incorporation into a generated software application for use on user interface hardware on the portable electronic device to display a first user interface display screen on the device display, with the first user interface display screen depicting a list of user interface controls organized in rows, wherein each row in the list includes a different set of one or more controls, wherein each different set of one or more controls is associated with a different set of functionality provided by one or more additional user interface display screens;
- generating feedback, using the one or more processors, based on a response to the first user interface display screen by one or more simulated user personas; and
- generating, using the one or more processors, an overall score for the first user interface display screen indicating whether the first user interface screen meets predetermined criteria associated with the one or more simulated mobile personas.

20. A processor-readable non-transitory storage medium including instructions executable by a digital processor for creating one or more user interface display screens providing interaction with an enterprise application, with the user interface screens for display on a device display of a device display, the processor-readable non-transitory storage medium including one or more instructions for:
- selecting, in response to user input and using the one or more processors, one or more mobile design patterns for incorporation into a generated software application for use on user interface hardware on the portable electronic device to display a first user interface display screen on the device display, with the first user interface display screen depicting a list of controls organized in rows, wherein each row in the list includes a different set of one or more controls, wherein each different set of one or more controls is associated with a different set of functionality provided by one or more additional user interface display screens;
- generating feedback, using the one or more processors, based on a response to the first user interface display screen by one or more simulated user personas; and
- generating, using the one or more processors, an overall score for the first user interface display screen indicating whether the first user interface screen meets predetermined criteria associated with the one or more simulated mobile personas.

* * * * *

UNITED STATES PATENT AND TRADEMARK OFFICE
CERTIFICATE OF CORRECTION

PATENT NO. : 9,778,920 B2
APPLICATION NO. : 14/527654
DATED : October 3, 2017
INVENTOR(S) : White et al.

Page 1 of 1

It is certified that error appears in the above-identified patent and that said Letters Patent is hereby corrected as shown below:

In the Claims

In Column 16, Line 12, in Claim 2, delete "filed" and insert -- field --, therefor.

Signed and Sealed this
Twenty-ninth Day of May, 2018

Andrei Iancu
*Director of the United States Patent and Trademark Office*